UNITED STATES PATENT OFFICE.

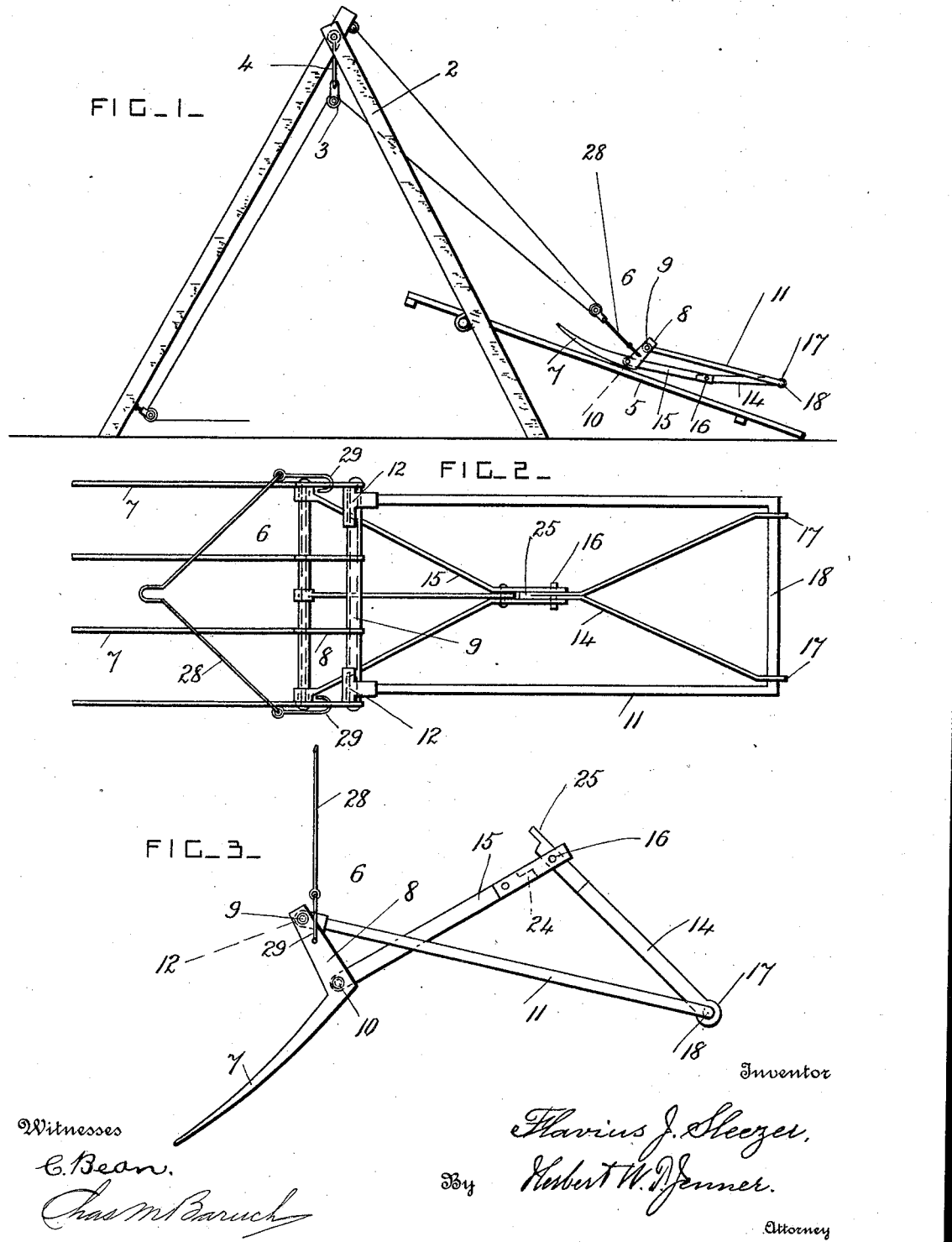

FLAVIUS J. SLEEZER, OF BRISTOL, ILLINOIS.

HOISTING APPARATUS.

1,053,324. Specification of Letters Patent. Patented Feb. 18, 1913.

Application filed April 23, 1912. Serial No. 692,683.

*To all whom it may concern:*

Be it known that I, FLAVIUS J. SLEEZER, a citizen of the United States, residing at Bristol, in the county of Kendall and State of Illinois, have invented certain new and useful Improvements in Hoisting Apparatus; and I do hereby declare the following to be a full, clear, and exact description of the invention, such as will enable others skilled in the art to which it appertains to make and use the same.

This invention relates to apparatus for loading hay, manure, and other similar substances onto carts; and it consists in the novel construction of the hoisting shovel or fork as hereinafter fully described and claimed.

In the drawings, Figure 1 is a side view of an apparatus constructed according to this invention. Fig. 2 is a plan view of the shovel, drawn to a larger scale. Fig. 3 is a side view of the shovel, showing its toggle members broken upwardly.

A derrick or supporting frame 2 of any approved construction is provided, and a suitable hoisting tackle 3 is suspended from a hanger 4 at the top of the derrick. An inclined track 5 has its upper end supported by the front legs of the derrick, with its lower end resting on the ground.

The shovel or fork 6 is preferably provided with a row of tines or teeth 7, having arms 8 arranged at an angle to their main portions. A crossbar 9 is secured between the free end portions of the arms 8, and a lower crossbar 10 is secured between the rear parts of the teeth at their points of junction with the arms.

A rectangular frame 11 is provided, and the front end of this frame has bearings 12 which are pivoted on the upper crossbar 9. Toggle members 14 and 15 are provided, and their adjacent end portions are pivoted together by a pin 16. The rear toggle member 14 has forked rear end portions 17 which are pivoted on the rear end bar 18 of the frame, which end bar also serves as a handle.

The front toggle member 15 has a stop 24 which bears against a stop 25 on the rear toggle member 14, when the toggle members are extended, as shown in Fig. 1, and the shovel is arranged to hoist the material. When in this position the center of the pivot pin 16 of the toggle members comes below a line drawn through the centers of the crossbars 10 and 18, so that the tines of the fork are held substantially parallel to the side bars of the frame 11.

A bail 28 is pivoted by hooks 29 to the outer arms 8 of the shovel or fork, between the ends of the crossbars, and this bail is connected to the hoisting tackle.

The material is dragged along the ground and up the inclined track 5, and the joint of the toggle members is lowered quickly onto the upper end of the track. This breaks the toggle members upwardly, as shown in Fig. 3, so that the material is dumped into a cart or other receptacle below the upper end of the track.

Any approved form of derrick and hoisting tackle may be used in connection with this shovel, and the material may be dumped by striking the toggle joint upwardly by any other approved means.

What I claim is:

1. The combination, with a shovel provided at one end with arms arranged at an angle to it, of a frame pivoted at one end to the free end portions of the said arms, toggle members pivoted together and pivoted at one end to the other end portions of the said arms and at the other end to the other end portion of the said frame, and a bail pivoted to the middle portions of the said arms between the pivots of the frame and toggle members.

2. The combination, with a shovel provided at one end with arms arranged at an angle to it, an upper crossbar secured between the free end portions of the said arms, and a lower crossbar secured between the other end portions of the said arms; of a frame pivoted at one end to the upper crossbar, toggle members pivoted together and pivoted at one end to the other end portion of the frame and at the other end to the lower cross-bar, and a bail pivoted to the middle portion of the frame between the upper and lower crossbars.

3. The combination, with a shovel provided with arms arranged at an angle to its main portion, of a frame pivoted to the free end portions of the said arms, a rear toggle member having a forked rear end portion which is pivoted to the rear part of the frame, a front toggle member pivoted to the rear toggle member and having a forked front end portion which is pivoted to the main portion of the shovel, said rear toggle member having also a central stiffening arm which is also pivoted to the shovel and which has a stop at its rear end which
5 normally engages with a stop on the rear toggle member, and hoisting mechanism for operating the said shovel.

In testimony whereof I have affixed my signature in the presence of two witnesses.

FLAVIUS J. SLEEZER.

Witnesses:
   HORACE YOUNG,
   G. P. PLANK.

Copies of this patent may be obtained for five cents each, by addressing the "Commissioner of Patents, Washington, D. C."